(12) United States Patent
Krug et al.

(10) Patent No.: US 10,341,276 B2
(45) Date of Patent: Jul. 2, 2019

(54) SYSTEMS AND METHODS FOR PROVIDING COMMUNICATIONS WITH OBSCURED MEDIA CONTENT BACKGROUNDS

(71) Applicant: Facebook, Inc., Menlo Park, CA (US)

(72) Inventors: Samantha P. Krug, Menlo Park, CA (US); Ian Mc Intyre Silber, San Jose, CA (US); Christopher Cunningham, Sunnyvale, CA (US); Ryan Jacob Gomba, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 684 days.

(21) Appl. No.: 14/567,707

(22) Filed: Dec. 11, 2014

(65) Prior Publication Data

US 2016/0173429 A1 Jun. 16, 2016

(51) Int. Cl.
*G06F 3/0484* (2013.01)
*H04L 12/58* (2006.01)
*G06F 3/0488* (2013.01)

(52) U.S. Cl.
CPC ............ *H04L 51/10* (2013.01); *G06F 3/0488* (2013.01); *G06F 3/04842* (2013.01); *H04L 51/046* (2013.01)

(58) Field of Classification Search
CPC ... H04L 51/10; H04L 51/046; G06F 3/04842; G06F 3/0488
See application file for complete search history.

(56) References Cited

U.S. PATENT DOCUMENTS

| | | | |
|---|---|---|---|
| 2014/0228120 A1* | 8/2014 | Hong | A63F 13/80 463/35 |
| 2014/0267363 A1* | 9/2014 | Kocienda | G06T 11/001 345/592 |
| 2015/0007351 A1* | 1/2015 | Janajri | H04L 63/04 726/30 |
| 2015/0094106 A1* | 4/2015 | Grossman | H04W 4/12 455/466 |

* cited by examiner

*Primary Examiner* — Jennifer N To
*Assistant Examiner* — Joseph R. Burwell
(74) *Attorney, Agent, or Firm* — Sheppard Mullin Richter & Hampton LLP

(57) ABSTRACT

Systems, methods, and non-transitory computer-readable media can transmit at least a media content item to a recipient device. A response can be received from the recipient device. At least the media content item can be obscured to produce an obscured media content item. The response and the obscured media content item can be presented. The response can overlay the obscured media content item.

17 Claims, 8 Drawing Sheets

SYSTEMS AND METHODS FOR PROVIDING COMMUNICATIONS WITH OBSCURED MEDIA CONTENT BACKGROUNDS

FIELD OF THE INVENTION

The present technology relates to the field of communications. More particularly, the present technology relates to techniques for providing communications with obscured media content backgrounds.

BACKGROUND

Today, people often utilize computing devices (or systems) for a wide variety of purposes. Users can use their computing devices to, for example, interact with one another, create content, share information, and access information. In some instances, a user can utilize his or her computing device to engage in communication. For example, under conventional approaches, a sending user can transmit a first text message to a recipient user. The recipient user can receive the first text message transmitted by the sending user. Upon receiving the first text message, the recipient user can view, read, access, or otherwise interact with the first text message. Moreover, the recipient user can decide to respond to the first text message by transmitting a second text message back to the original sending user. The original sending user can receive the second text message and can view, read, access, or otherwise interact with the second text message.

In another example, under conventional approaches, the sending user can transmit media content, such as images, audio, videos, and text, to the recipient. The recipient user can receive the media content and can access, view, or otherwise interact with the media content upon receipt. However, conventional approaches to communications can be uninteresting, boring, or not sufficiently interactive. These and other similar concerns can reduce or create challenges for the overall user experience associated with using computing devices to engage in communication.

SUMMARY

Various embodiments of the present disclosure can include systems, methods, and non-transitory computer readable media configured to transmit at least a media content item to a recipient device. A response can be received from the recipient device. At least the media content item can be obscured to produce an obscured media content item. The response and the obscured media content item can be presented. The response can overlay the obscured media content item.

In an embodiment, a touch gesture can be detected subsequent to the presenting of the response and the obscured media content item. The response can be removed from presentation while the touch gesture is detected. The media content item can be presented while the touch gesture is detected.

In an embodiment, an absence of the touch gesture can be detected. The response and the obscured media content item can be presented while the absence of the touch gesture is detected. The response can overlay the obscured media content item.

In an embodiment, the presenting of the media content item while the touch gesture is detected can include presenting an unobscure animation to show the media content item. The presenting of the response and the obscured media content item while the absence of the touch gesture is detected can include presenting an obscure animation to show the obscured media content item.

In an embodiment, at least a textual message can be transmitted in conjunction with the media content item to the recipient device. A touch gesture can be detected subsequent to the presenting of the response and the obscured media content item. The response can be removed from presentation while the touch gesture is detected. The textual message and the media content item can be presented while the touch gesture is detected. The textual message can overlay the media content item.

In an embodiment, an absence of the touch gesture can be detected. The textual message can be removed from presentation while the absence of the touch gesture is detected. The response and the obscured media content item can be presented while the absence of the touch gesture is detected. The response can overlay the obscured media content item.

In an embodiment, the response can include at least one of a textual message or a second media content item.

In an embodiment, an amount of obscurity associated with the obscured media content item can increase over time.

In an embodiment, a first copy of the media content item can be stored at the computing system. A second copy of the media content item can be stored at the recipient device.

In an embodiment, the response and the obscured media content item can be presented within an interface layer included a stack structure. The interface layer can be positioned in the stack structure based on time data associated with the interface layer. A flicking touch gesture performed with respect to the interface layer can cause a communication thread between the computing system and the recipient device to cease and can cause the first copy of the media content item to be removed from the computing system and the second copy of the media content item to be removed from the recipient device.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
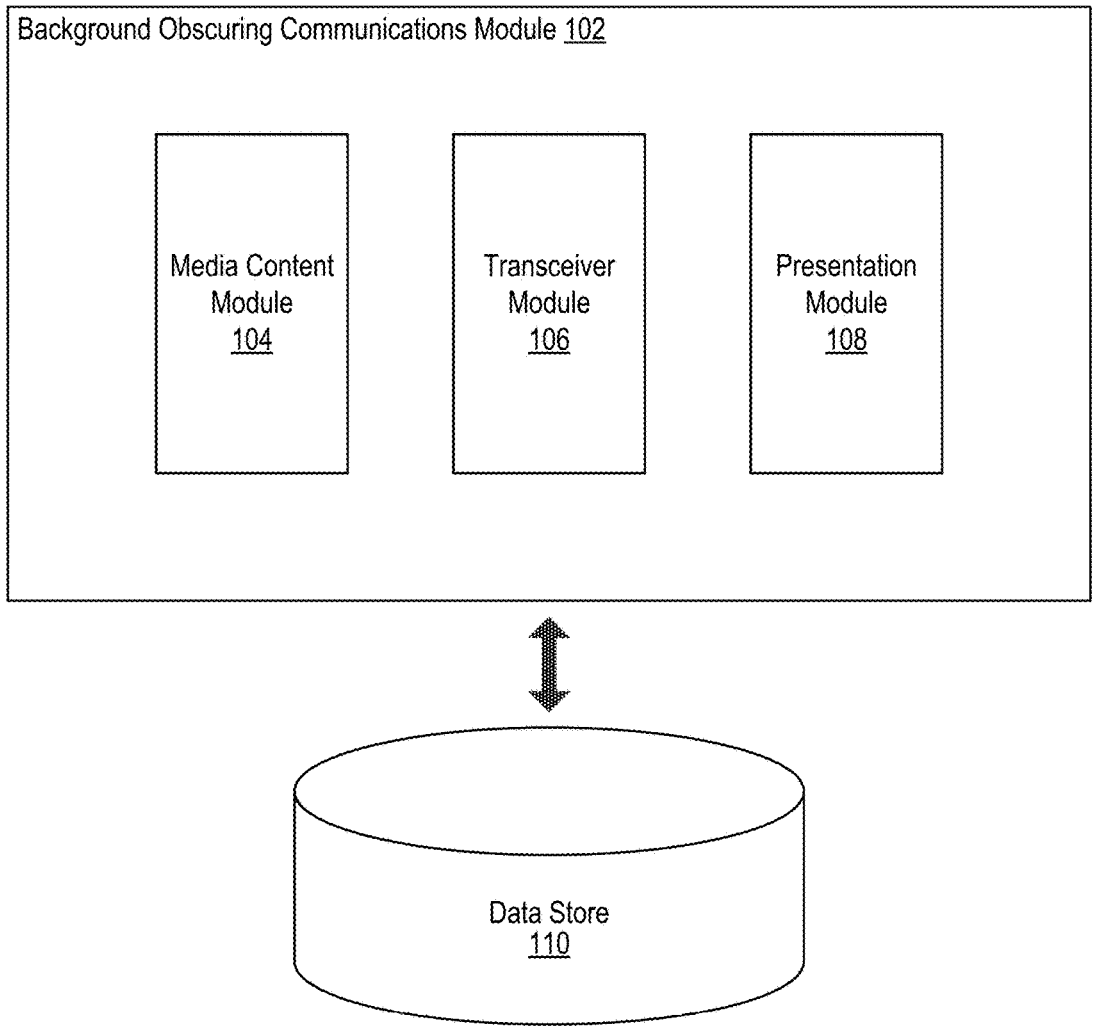
FIG. 1 illustrates an example system including an example background obscuring communications module configured to facilitate providing communications with obscured media content backgrounds, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Communications with Obscured Media Content Backgrounds

People use computing devices (or systems) for a wide variety of purposes. Computing devices can provide different kinds of functionality. Users can utilize their computing devices to produce information, access information, and share information. In some cases, people communicate or exchange information using computing devices. Conventional approaches to communicating via computing devices can include text messaging, such as short message service (SMS) and multimedia messaging service (MMS). For example, under conventional approaches, a first computing device can transmit a communication, including text, images, audio, and/or video, etc., to a second computing device over a cellular or local network. The second computing device can receive the communication and be utilized to view, access, or otherwise interact with the content included in the communication.

As such, conventional approaches generally involve a sending party creating or producing content, and then sending the created or produced content to a receiving party. The receiving party receives and consumes (e.g., uses, views, accesses, interacts with, etc.) the content. In some instances, the receiving party can provide a reply or response back to the sending party. However, these and other similar types of conventional approaches to providing communications can be boring, uninteresting, and/or not sufficiently interactive.

Therefore, an improved approach can be beneficial for addressing or alleviating various concerns associated with conventional approaches. The disclosed technology can offer a more interesting and interactive approach by providing communications with obscured media content backgrounds. Various embodiments of the present disclosure can transmit at least a media content item to a recipient device. A response can be received from the recipient device. At least the media content item can be obscured to produce an obscured media content item. The response and the obscured media content item can be presented. The response can overlay the obscured media content item, such that the obscured media content item can provide a background for the response. It is contemplated that there can be many variations and/or other possibilities.

FIG. 1 illustrates an example system 100 including an example background obscuring communications module 102 configured to facilitate providing communications with obscured media content backgrounds, according to an embodiment of the present disclosure. As shown in the example of FIG. 1, the background obscuring communications module 102 can include a media content module 104, a transceiver module 106, and a presentation module 108. In some instances, the example system 100 can also include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the background obscuring communications module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the background obscuring communications module 102 can be implemented, in part or in whole, as software running on one or more computing devices or systems, such as on a user or client computing device. For example, the background obscuring communications module 102 can be implemented as or within an application (e.g., app), a program, or an applet, etc., running on a user computing device or a client computing system. In another example, the background obscuring communications module 102 can be implemented using one or more computing devices or systems that include one or more servers, such as network servers or cloud servers. In some instances, the background obscuring communications module 102 can, in part or in whole, be implemented within or configured to operate in conjunction with a social networking system (or service), such as the social networking system 730 of FIG. 7. It should be understood that there can be many variations or other possibilities.

The media content module 104 can be configured to receive or acquire media content, such as a media content item. The media content item can, for example, include at least one of an image or a video (e.g., one or more video image frames). In some embodiments, the media content module 104 can correspond to, be included in, and/or operate with one or more media sensors, such as cameras and/or microphones, associated with a computing device (or system). The media content module 104 can, for example, work in conjunction with the media sensor to capture, record, receive, or otherwise acquire the media content item.

The transceiver module 106 can be configured to transmit and/or receive information. The transceiver module 106 can facilitate transmitting at least a media content item, such as the media content item received or acquired by the media content module 104, to a recipient device. In one example, the transceiver module 106 can reside in and/or operate with the computing device (or system) associated with the media content module 104. The transceiver module 106 can transmit at least the media content item, such as an image or video, to the recipient device. The recipient device can correspond to another computing device (or system) that is separate from the computing device associated with the media content module 104 and the transceiver module 106.

In some cases, the recipient device can provide a response or reply. The transceiver module 106 can be configured to facilitate receiving the response from the recipient device. In one example, a user of the recipient device (i.e., recipient user) can receive the media content item transmitted by the transceiver module 106. The recipient user can view, access, or otherwise interact with the media content item. The recipient user can then decide to provide a reply or response to the media content item. The response or reply can, for example, include at least one of a textual message (e.g., a string of text, alphanumeric characters, emoticons, etc.) or a second media content item (e.g., another image or video).

In some implementations, the transceiver module 106 can integrate transmitting and receiving functionalities to perform transmission and receiving operations. In some implementations, although not explicitly illustrated in the example system 100, the transceiver module 106 can include a transmitter element and a receiver element. The transmitter element can be configured to perform one or more transmission operations and the receiver element can be configured to perform one or more receiving operations. It should be appreciated that there can be many variations and other possibilities.

In some embodiments, the media content module 104 and the transceiver module 106 can communicate and/or operate with the at least one data store 110. The at least one data store 110 can be configured to store and maintain various types of data, including (but not limited to) the media content item and the response. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, groups, posts, communications, content, account settings, privacy settings, a social graph, and various other types of data. In some implementations, the at least one data store 110 can store information associated with users, such as user identifiers, user information, user specified settings, content produced by users, and various other types of user data. As shown in the example system 100, the background obscuring communications module 102 can be configured to communicate and/or operate with the at least one data store 110.

Moreover, the presentation module 108 can be configured to facilitate obscuring at least the media content item to produce an obscured media content item. The presentation module 108 can also be configured to facilitate presenting the response and the obscured media content item. The response can overlay the obscured media content item. The presentation module 108 will be discussed in more detail with reference to FIG. 2.

Figure 2:
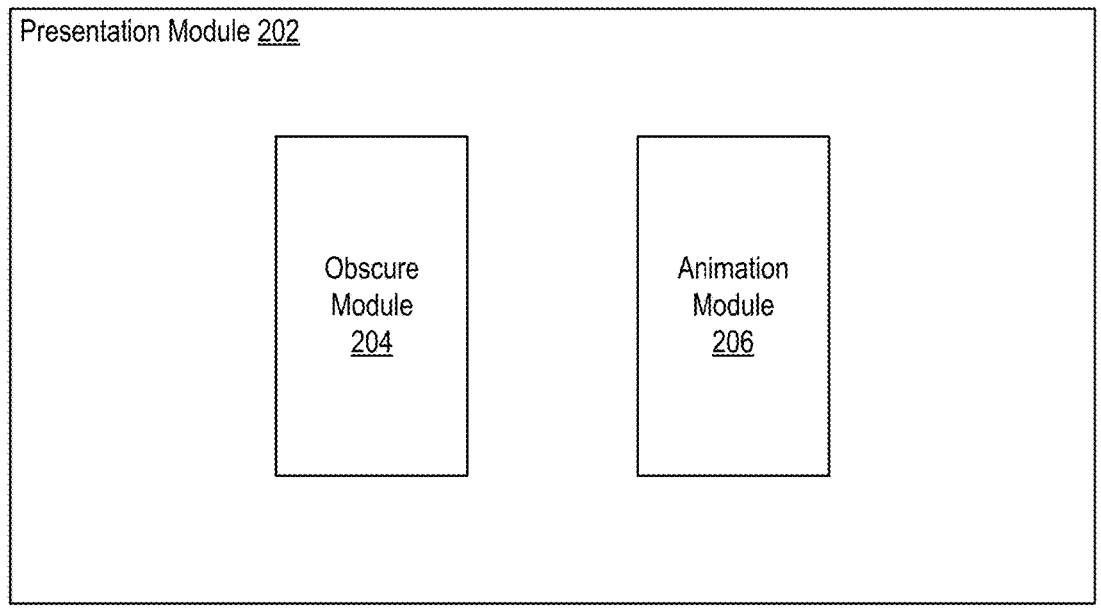
FIG. 2 illustrates an example presentation module configured to facilitate providing communications with obscured media content backgrounds, according to an embodiment of the present disclosure.

FIG. 2 illustrates an example presentation module 202 configured to facilitate providing communications with obscured media content backgrounds, according to an embodiment of the present disclosure. In some embodiments, the presentation module 108 of FIG. 1 can be implemented as the example presentation module 202. As shown in FIG. 2, the example presentation module 202 can include an obscure module 204 and an animation module 206.

As discussed above, the presentation module 202 can facilitate obscuring at least a media content item to produce an obscured media content item. In some embodiments, the obscure module 204 can facilitate obscuring at least the media content item to produce the obscured media content item. The obscure module 204 can apply a media obscuring process to the media content item. In some instances, the media obscuring process can include modifying or manipulating one or more pixels of the media content item to produce the obscured media content item, which can correspond to a blurred version, a pixelated version, and/or an mosaic version, etc., of the originally or initially transmitted media content item. Many variations are possible.

Moreover, the presentation module 202 can also be configured to facilitate presenting a response and the obscured media content item, and the response can overlay the obscured media content item, as discussed previously. The presentation module 202 can facilitate rendering a presentation of the response and the obscured media content item such that the response is overlaid on top of the obscured media content item. In one example, if a recipient computing device (or system) receives a transmitted image and provides a response in the form of a textual message, the presentation module 202 can render the textual message to overlay a blurred version of the originally transmitted image. The presentation module 202 can then present or display, at the computing device or system that originally transmitted the image, the textual message response overlaying the blurred image. This process can be repeated based on additional back-and-forth responses.

Furthermore, the computing device or system that originally transmitted the media content item (e.g., image) can include one or more touch sensors, such as a touch display. In some cases, the one or more touch sensors can detect a touch gesture subsequent to the presenting of the response and the obscured media content item, such as when a user of the computing device or system touches, taps, and holds down his or her finger on the touch display that is presenting the response and the obscured media content item. The presentation module 202 can operate with the one or more touch sensors to remove the response from presentation while the touch gesture is detected and present the media content item while the touch gesture is detected. Continuing with the previous example, the presentation module 202 can remove the textual message response and the blurred image from display and instead display the originally transmitted image while it is detected that the user is pressing and holding down his or her finger on the touch display.

In some cases, the one or more touch sensors can detect an absence of the touch gesture, such as when the user releases or lifts up his or her finger from pressing and holding the touch display. The presentation module 202 can present the response and the obscured media content item while the absence of the touch gesture is detected. The response can overlay the obscured media content item. Continuing with the previous example, the presentation module 202 can revert back to displaying the textual message response overlaying the blurred image while it is detected that the user is not pressing and holding the touch display.

Moreover, in some embodiments, the computing device or system (e.g., using the background obscuring communications module 102 of FIG. 1) can transmit at least a textual message in conjunction with the media content item to the recipient device. For example, the computing device or system that originally transmitted the image can also have transmitted to the recipient device a caption, comment, description, emoticons, or other text in conjunction with the image. In some cases, a touch gesture can be detected subsequent to the presenting of a response and an obscured media content item. The response can be removed from presentation while the touch gesture is detected. The textual message (e.g., caption or comment for the media content item) and the media content item can be presented while the touch gesture is detected, and the textual message can overlay the media content item. In addition, in some instances, an absence of the touch gesture can be detected. The textual message (e.g., caption, comment, etc.) can be removed from presentation while the absence of the touch gesture is detected. The response and the obscured media content item can be presented while the absence of the touch gesture is detected, and the response can overlay the obscured media content item. Again, many variations are possible.

Further, in some embodiments, the presenting of the media content item while the touch gesture is detected can include presenting an unobscure animation to show the media content item, and the presenting of the response and the obscured media content item while the absence of the touch gesture is detected can include presenting an obscure animation to show the obscured media content item. The animation module 206 can be configured to facilitate presenting the unobscure animation to show the media content item and presenting the obscure animation to show the obscured media content item. In one example, the animation module 206 can provide a unblurring animation to progress from displaying a blurred image to revealing an originally transmitted and unobscured (e.g., non-blurred) image. In another example, the animation module 206 can provide a blurring animation to progress from displaying the originally transmitted and unobscured image to displaying a blurred version of the image. There can be many variations and other possibilities.

Figure 3:
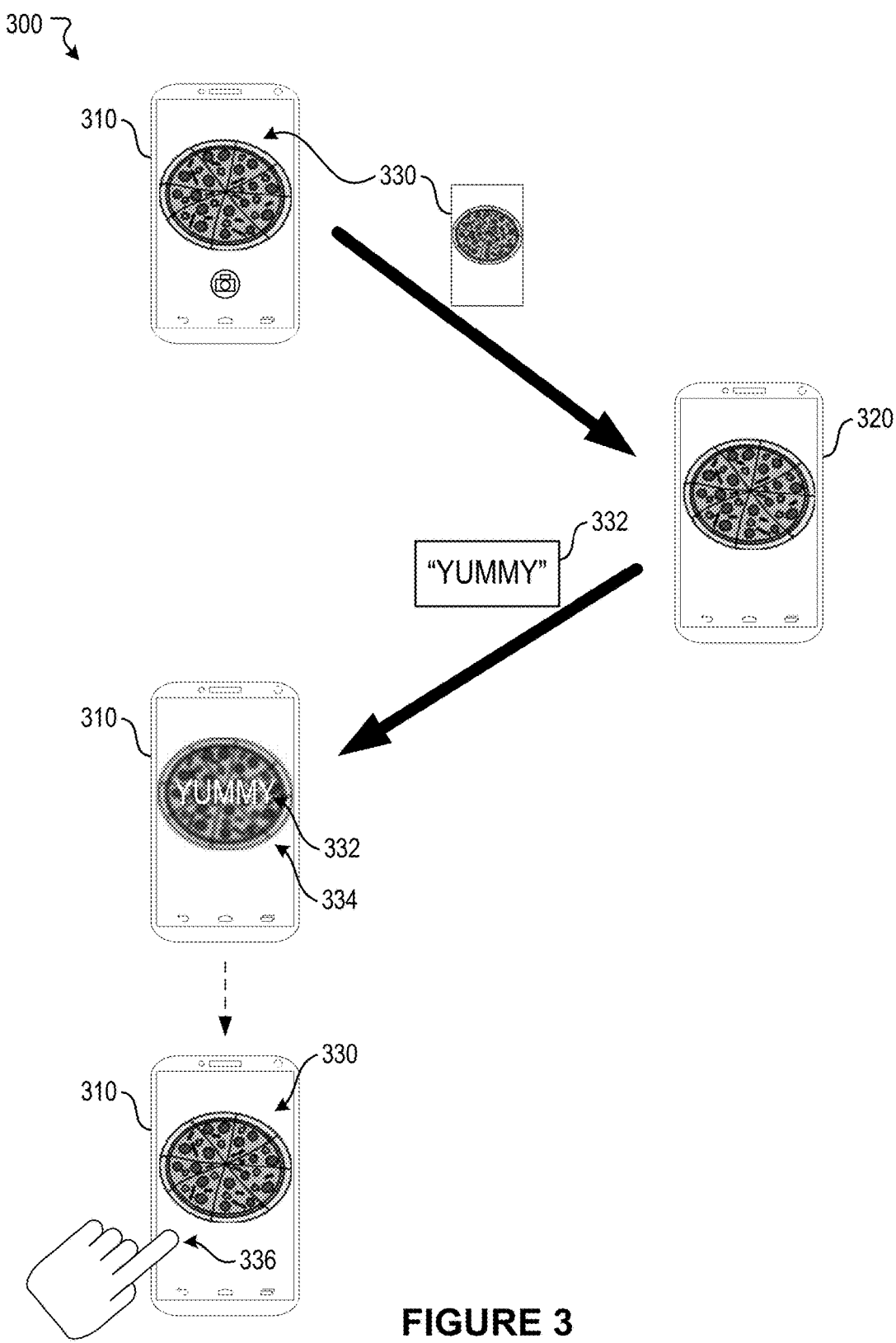
FIG. 3 illustrates an example scenario associated with providing communications with obscured media content backgrounds, according to an embodiment of the present disclosure.

FIG. 3 illustrates an example scenario 300 associated with providing communications with obscured media content backgrounds, according to an embodiment of the present disclosure. The example scenario 300 illustrates a computing device (or system) 310 that communicates with and/or shares information with a recipient computing device (or system) 320.

As shown in the example scenario 300, the computing device 310 can capture a media content item 330 such as an image of a pizza. The computing device 310 can transmit at least the media content item 330 to the recipient device 320. The recipient device 320 can access at least the transmitted media content item 330, such as when a recipient user uses the recipient device 320 to view the image of the pizza. In some cases, the recipient user can use the recipient device 320 to provide a response 332, such as a textual message or another media content item. In the example scenario 300, the recipient device 320 provides a textual message response (e.g., "YUMMY") 332 to be received by the computing device 310 that initially or originally transmitted the pizza image 330. The computing device 310 can obscure at least the media content item to produce an obscured media content item. In this example, the pizza image 310 can be blurred to produce a blurred pizza image 334. Moreover, the response (e.g., textual message response "YUMMY") 332 and the obscured media content item (e.g. blurred pizza image) 334 can be presented at the computing device 310. The response 332 can overlay the obscured media content item 334.

Moreover, in some instances, the computing device 310 can detect a touch gesture subsequent to the presenting of the response 332 and the obscured media content item 334. For example, a user of the computing device 310 can use his or her finger to touch and hold 336 a touch display that is presenting the response 332 overlaying the obscured media content item 334. As a result, the computing device 310 can remove the response 332 from presentation while the touch gesture 336 is detected. The computing device 310 can present the initially or originally transmitted unobscured media content item 330 while the touch gesture 336 is detected. Furthermore, in some cases, the computing device 310 can detect an absence of the touch gesture. The computing device 310 can revert back to presenting the response 332 overlaying the obscured media content item 334 while the absence of the touch gesture is detected.

Figure 7:
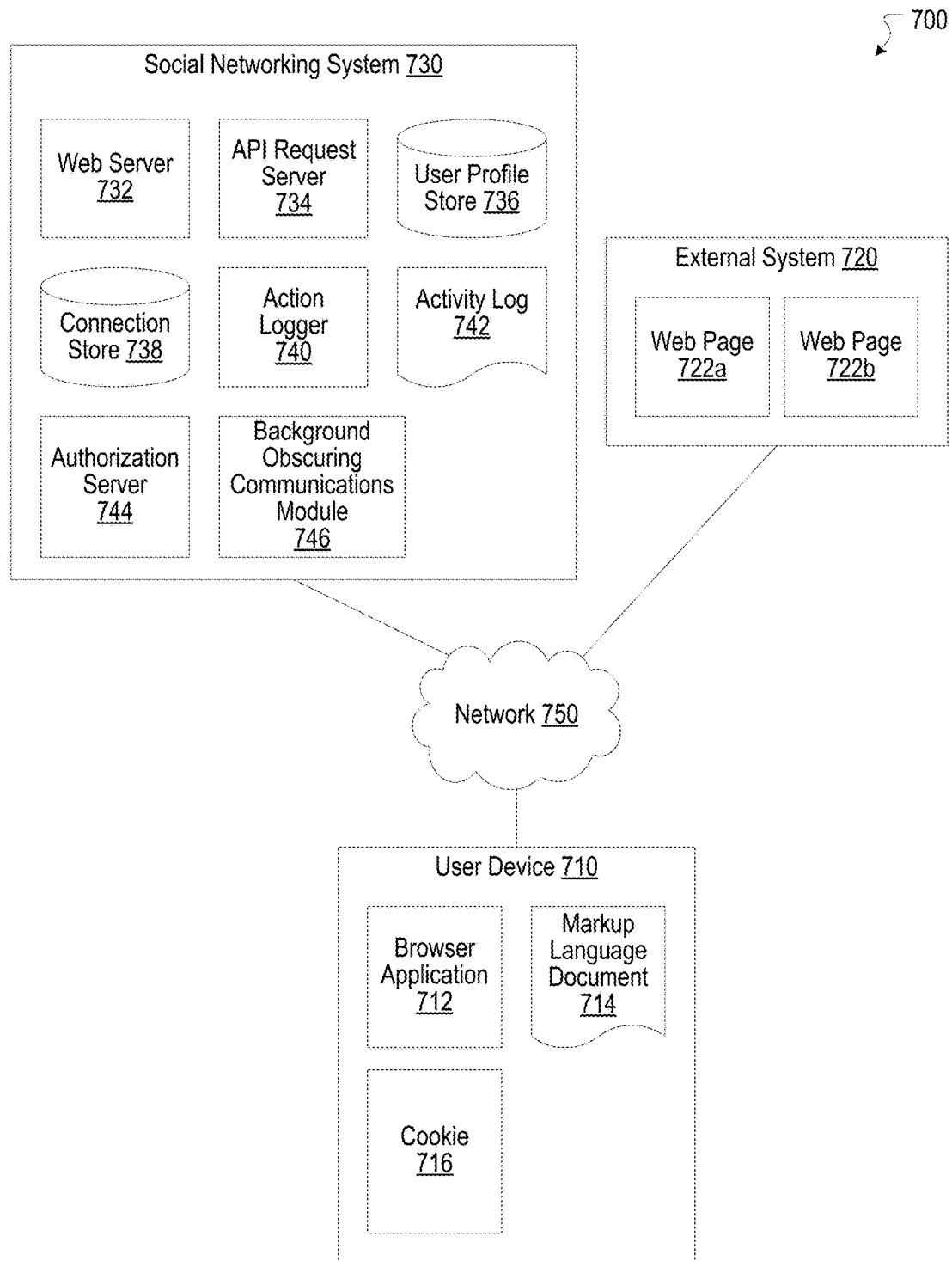
FIG. 7 illustrates a network diagram of an example system including an example social networking system that can be utilized in various scenarios, according to an embodiment of the present disclosure.

In some implementations, the computing device (or system) 310 and the recipient device (or system) 320 can operate with one or more servers, such as one or more servers associated with a social networking system (e.g., the social networking system 730 of FIG. 7). The one or more servers can facilitate the communicating and/or sharing of information between the computing device 310 and the recipient device 320.

Further, in some embodiments, a first copy of the media content item can be stored at the computing device or system 310 and a second copy of the media content item can be stored at the recipient device 320. As such, the computing device 310 only has to transmit the media content item to the recipient device 320 once. Accordingly, when there are back-and-forth responses between the computing device 310 and the recipient device 320, only the responses need to be transmitted whereas the media content item does not need to be transmitted repeated between the computing device 310 and the recipient device 320.

Additionally, in some cases, the response and the obscured media content item can be presented within an interface layer included a stack structure. The interface layer can be positioned in the stack structure based on time data associated with the interface layer, such as by positioning the oldest layer on top and the newest layer at the bottom (or vice versa). Each layer can correspond to a particular conversation or message thread between the computing device and one or more recipient devices. In some implementations, a flicking touch gesture performed with respect to the interface layer can cause a communication thread between the computing device (or system) and the recipient device to cease and can cause the first copy of the media content item to be removed from the computing device and the second copy of the media content item to be removed from the recipient device. It should be appreciated that many variations are possible.

Figure 4:
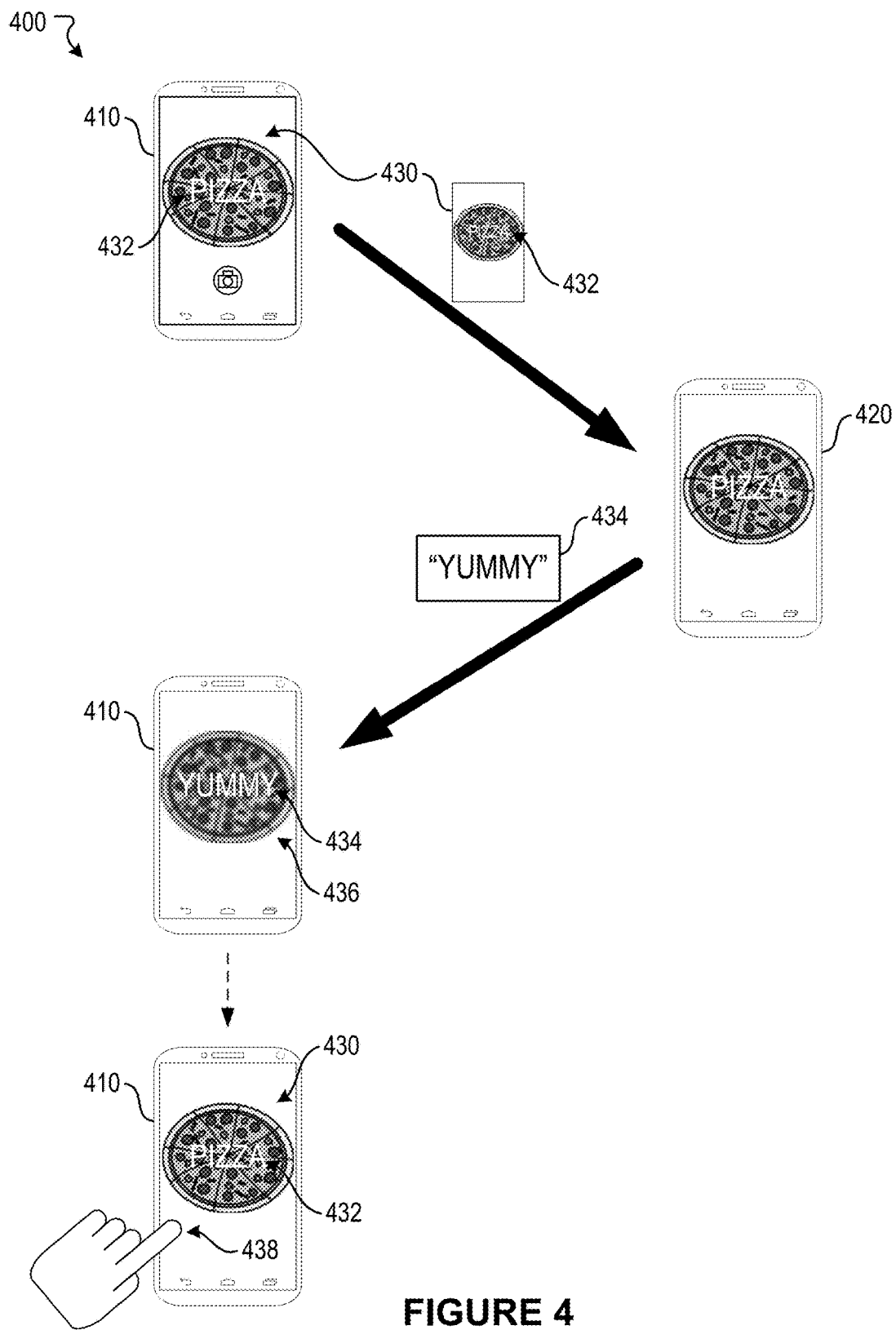
FIG. 4 illustrates an example scenario associated with providing communications with obscured media content backgrounds, according to an embodiment of the present disclosure.

FIG. 4 illustrates an example scenario 400 associated with providing communications with obscured media content backgrounds, according to an embodiment of the present disclosure. The example scenario 400 illustrates a computing device (or system) 410 that communicates with and/or shares information with a recipient computing device (or system) 420.

In the example scenario 400, the computing device 410 can transmit a media content item (e.g., a pizza image) 430 to the recipient device 420. In some cases, at least a textual message 432, such as a caption or comment for the media content item 430, can be transmitted in conjunction with the media content item 430 to the recipient device 420. A response 434 from the recipient device 420 can be received by the computing device 410. The computing device 410 can produce an obscured media content item 436, such as a blurred pizza image. The computing device 410 can present the response 434 overlaying the obscured media content item 436.

In some instances, a touch gesture 438 can be detected by the computing device 410 subsequent to the presenting of the response 434 and the obscured media content item 436. The computing device 410 can remove the response 434 from presentation while the touch gesture 438 is detected and can present the textual message 432 (or whichever previous communication) overlaying the media content item 430 while the touch gesture 438 is detected.

Additionally, in some embodiments, the computing device 410 can detect an absence of the touch gesture. The computing device 410 can remove the textual message 432 (or whichever previous communication) from presentation while the absence of the touch gesture is detected and can revert to presenting the response 434 overlaying the obscured media content item 436 while the absence of the touch gesture is detected. Again, many variations are possible.

Figure 5:
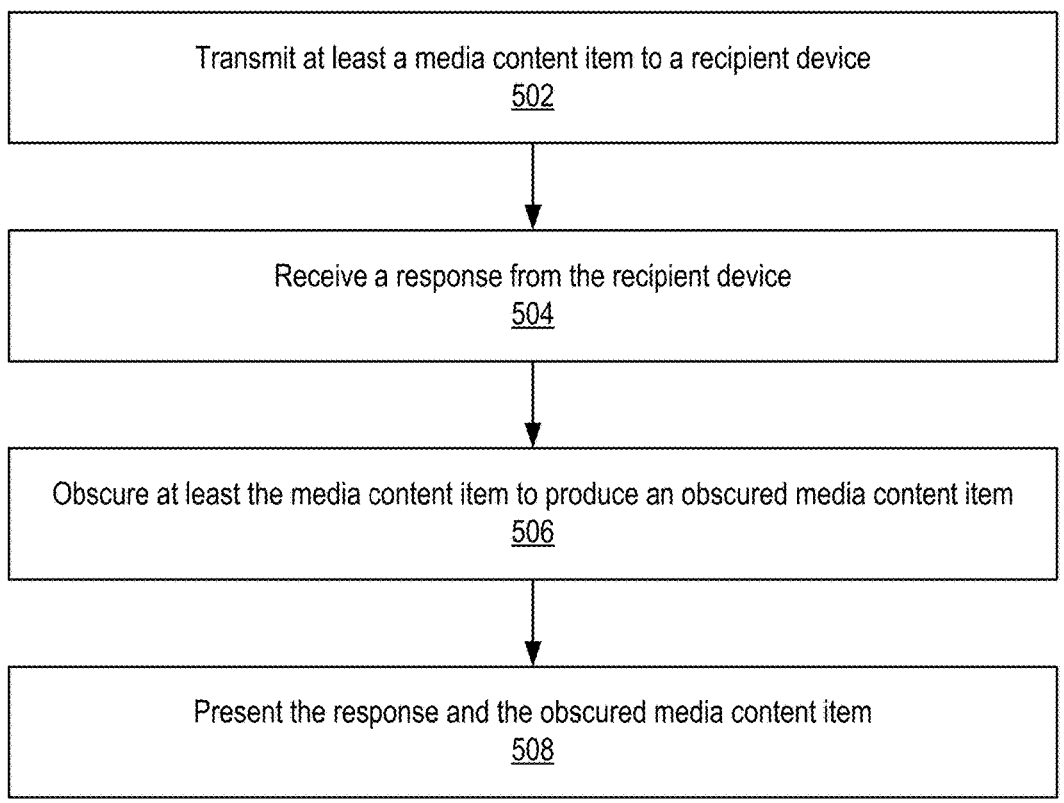
FIG. 5 illustrates an example method associated with providing communications with obscured media content backgrounds, according to an embodiment of the present disclosure.

FIG. 5 illustrates an example method 500 associated with providing communications with obscured media content backgrounds, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can transmit at least a media content item to a recipient device. At block 504, the example method 500 can receive a response from the recipient device. At block 506, the example method 500 can obscure at least the media content item to produce an obscured media content item. At block 508, the example method 500 can present the response and the obscured media content item. The response can overlay the obscured media content item.

Figure 6:
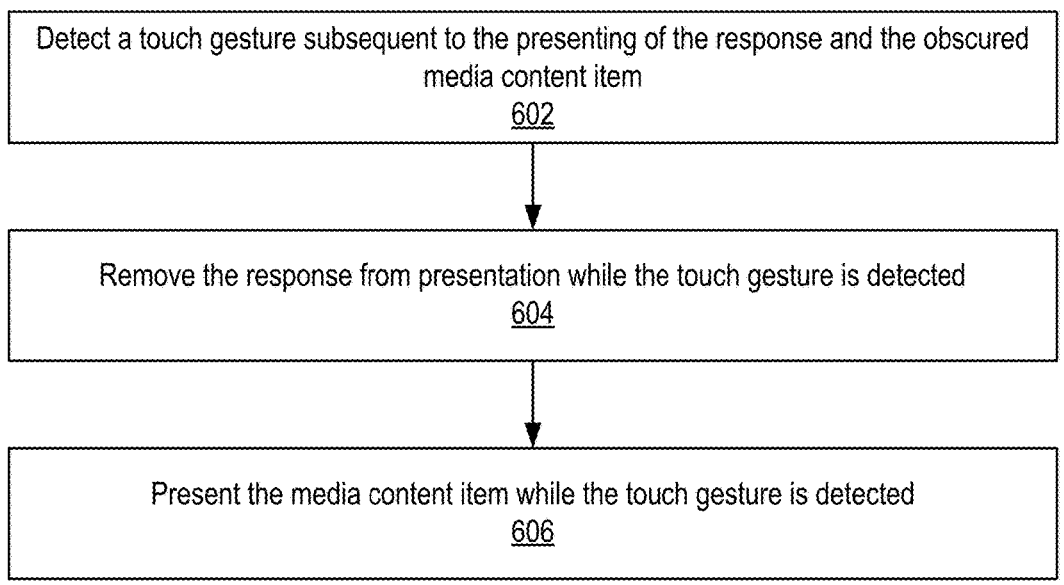
FIG. 6 illustrates an example method associated with providing communications with obscured media content backgrounds, according to an embodiment of the present disclosure.

FIG. 6 illustrates an example method 600 associated with providing communications with obscured media content backgrounds, according to an embodiment of the present disclosure. Again, it should be understood that there can be additional, fewer, or alternative steps performed in similar or alternative orders, or in parallel, within the scope of the various embodiments unless otherwise stated.

At block 602, the example method 600 can detect a touch gesture subsequent to the presenting of the response and the obscured media content item. At block 604, the example method 600 can remove the response from presentation while the touch gesture is detected. At block 606, the example method 600 can present the media content item while the touch gesture is detected.

In some embodiments, an amount of obscurity (e.g., blurriness, pixelation, etc.) associated with the obscured media content item can increase over time. In some embodiments, tapping and holding down longer on a response overlaying an obscured media content item can initiate a scroll through of previous responses. It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained. In another example, various embodiments of the present disclosure can learn, improve, and/or be refined over time.

Social Networking System—Example Implementation

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes"

another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a background obscuring communications module 746. The background obscuring communications 746 can, for example, be implemented as the background obscuring communications 102 of FIG. 1. Other features of the background obscuring communications module 746 are discussed herein in connection with the background obscuring communications module 102.

Hardware Implementation

Figure 8:
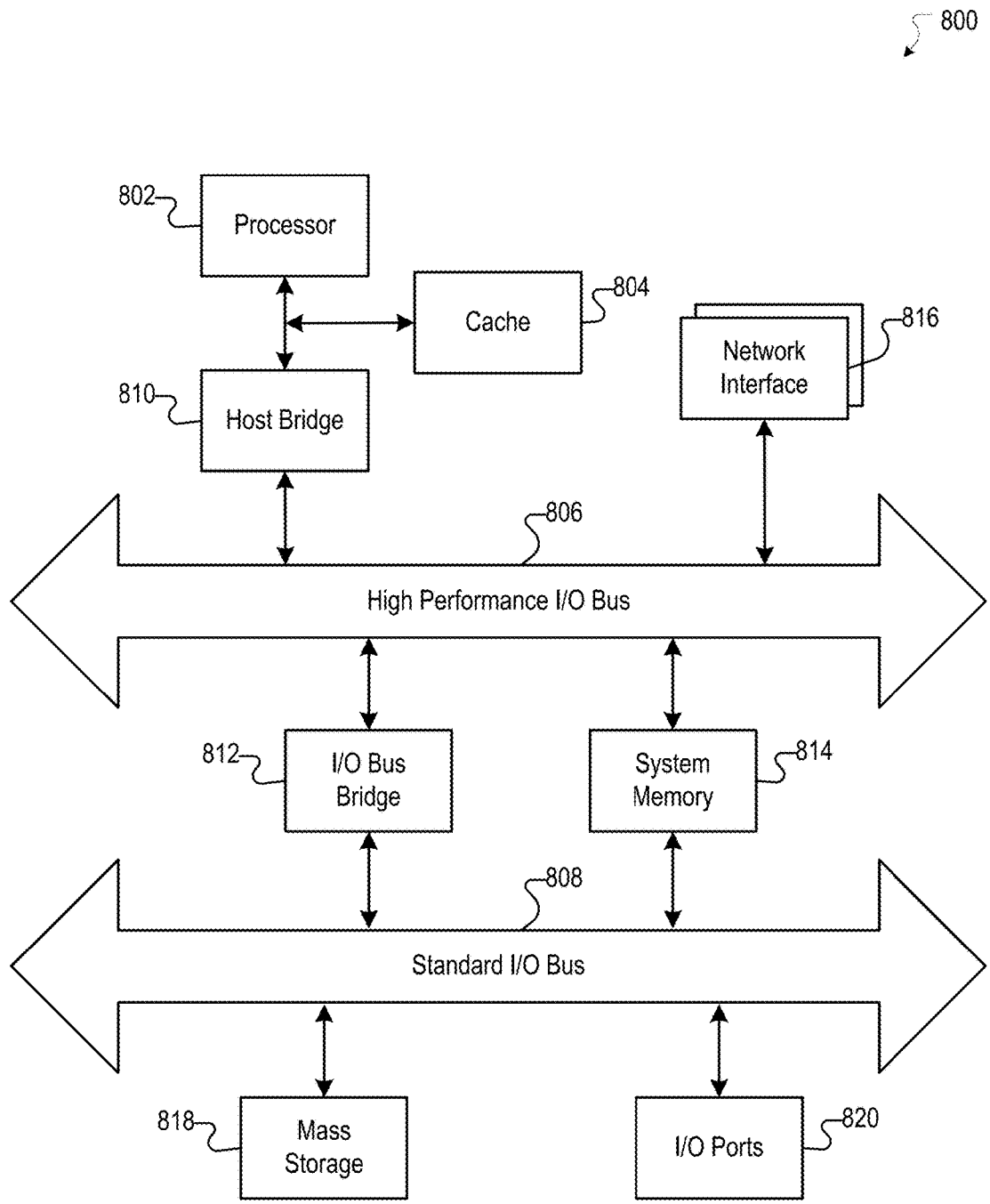
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, a communication thread comprising a plurality of responses wherein at least one of the plurality of responses comprises a media content item;
   obscuring, by the computing system, the media content item to produce an obscured media content item;
   presenting, by the computing system, the communication thread wherein the plurality of responses and the obscured media content item are overlaid in an order based on time data associated with each response and the obscured media content item;
   removing, by the computing system, while a first touch gesture is detected, each response and the obscured media content item from presentation of the communication thread in reverse of the order based on time data, wherein removing the obscured media content item comprises:
      presenting the media content item while the first touch gesture is detected, wherein the presenting the media content item comprises presenting an unobscure animation to show the media content item; and
   ending, by the computing system, the communication thread when a second touch gesture is detected.

2. The computer-implemented method of claim 1, further comprising:
   detecting an absence of the first touch gesture; and
   presenting the communication thread, while the absence of the first touch gesture is detected, in the order based on time data.

3. The computer-implemented method of claim 2, wherein the presenting of the communication thread while the absence of the first touch gesture is detected includes presenting an obscure animation to show the obscured media content item.

4. The computer-implemented method of claim 1, further comprising:
   transmitting at least a textual message in conjunction with the media content item; and
   presenting the textual message and the media content item while the first touch gesture is detected, the textual message overlaying the media content item.

5. The computer-implemented method of claim 4, further comprising:
   detecting an absence of the first touch gesture; and
   removing the textual message from presentation while the absence of the first touch gesture is detected; and
   presenting the communication thread, while the absence of the first touch gesture is detected, in an order based on time data associated with each response and the obscured media content item.

6. The computer-implemented method of claim 1, wherein the plurality of responses includes at least one of a textual message or a second media content item.

7. The computer-implemented method of claim 1, wherein an amount of obscurity associated with the obscured media content item increases over time.

8. The computer-implemented method of claim 1, wherein a first copy of the media content item is stored at the computing system, and wherein a second copy of the media content item is stored at a recipient device.

9. The computer-implemented method of claim 8, wherein the communication thread is presented within an interface layer included in a stack structure, wherein the interface layer is positioned in the stack structure based on time data associated with the interface layer, and wherein a flicking touch gesture performed with respect to the interface layer causes the communication thread to cease and causes the first copy of the media content item to be removed from the computing system and the second copy of the media content item to be removed from the recipient device.

10. A system comprising:
   at least one processor; and
   a memory storing instructions that, when executed by the at least one processor, cause the system to perform:
      receiving a communication thread comprising a plurality of responses wherein at least one of the plurality of responses comprises a media content item;

obscuring the media content item to produce an obscured media content item;

presenting the communication thread wherein the plurality of responses and the obscured media content item are overlaid in an order based on time data associated with each response and the obscured media content item;

removing, while a first touch gesture is detected, each response and the obscured media content item from presentation of the communication thread in reverse of the order associated with each response and the obscured media content item, wherein removing the obscured media content item comprises:

presenting the media content item while the touch gesture is detected, wherein the presenting the media content item comprises presenting an unobscure animation to show the media content item; and ending the communication thread when a second touch gesture is detected.

11. The system of claim 10, wherein the instructions cause the system to further perform:

detecting an absence of the first touch gesture; and presenting the communication thread, while the absence of the first touch gesture is detected, in the order based on time data.

12. The system of claim 11, wherein the presenting of the communication thread while the absence of the first touch gesture is detected includes presenting an obscure animation to show the obscured media content item.

13. The system of claim 10, wherein the instructions cause the system to further perform:

transmitting at least a textual message in conjunction with the media content item; and presenting the textual message and the media content item while the first touch gesture is detected, the textual message overlaying the media content item.

14. A non-transitory computer-readable storage medium including instructions that, when executed by at least one processor of a computing system, cause the computing system to perform:

receiving a communication thread comprising a plurality of response wherein at least one of the plurality of responses comprises a media content item;

obscuring the media content item to produce an obscured media content item;

presenting the communication thread wherein the plurality of responses and the obscured media content item are overlaid in an order based on time data associated with each response and the obscured media content item;

removing, while a first touch gesture is detected, each response and the obscured media content item from presentation of the communication thread in reverse of the order based on time data, wherein removing the obscured media content item comprises:

presenting the media content item while the first touch gesture is detected, wherein the presenting the media content item comprises presenting an unobscure animation to show the media content item; and ending the communication thread when a second touch gesture is detected.

15. The non-transitory computer-readable storage medium of claim 14, wherein the instructions cause the system to further perform:

detecting an absence of the first touch gesture; and presenting the communication thread, while the absence of the first touch gesture is detected, in the order based on time data.

16. The non-transitory computer-readable storage medium of claim 15, wherein the presenting of the communication thread while the absence of the first touch gesture is detected includes presenting an obscure animation to show the obscured media content item.

17. The non-transitory computer-readable storage medium of claim 14, wherein the instructions cause the system to further perform:

transmitting at least a textual message in conjunction with the media content item; and presenting the textual message and the media content item while the first touch gesture is detected, the textual message overlaying the media content item.

* * * * *